(12) United States Patent
Shang et al.

(10) Patent No.: US 11,423,598 B2
(45) Date of Patent: Aug. 23, 2022

(54) METHOD, APPARATUS AND COMPUTER PROGRAM FOR GENERATING AN IMAGE

(71) Applicant: Robert Bosch GmbH, Stuttgart (DE)

(72) Inventors: Wenling Shang, Amsterdam (NL); Kihyuk Sohn, Fremont, CA (US)

(73) Assignee: Robert Bosch GmbH, Stuttgart (DE)

( * ) Notice: Subject to any disclaimer, the term of this patent is extended or adjusted under 35 U.S.C. 154(b) by 330 days.

(21) Appl. No.: 16/784,463

(22) Filed: Feb. 7, 2020

(65) Prior Publication Data
US 2020/0258283 A1 Aug. 13, 2020

(30) Foreign Application Priority Data
Feb. 13, 2019 (EP) .................................... 19156898

(51) Int. Cl.
| | |
|---|---|
| *G06T 15/00* | (2011.01) |
| *G06N 20/20* | (2019.01) |
| *G06F 17/18* | (2006.01) |
| *G06N 3/04* | (2006.01) |
| *G06N 3/08* | (2006.01) |

(52) U.S. Cl.
CPC .............. *G06T 15/00* (2013.01); *G06F 17/18* (2013.01); *G06N 3/0454* (2013.01); *G06N 3/08* (2013.01); *G06N 20/20* (2019.01)

(58) Field of Classification Search
CPC ........... G06T 15/00; G06T 2207/20084; G06T 11/00; G06F 17/18; G06N 3/08; G06N 20/20; G06N 3/0454
USPC ......................................................... 382/155
See application file for complete search history.

(56) References Cited

U.S. PATENT DOCUMENTS

| | | | |
|---|---|---|---|
| 2020/0097742 A1* | 3/2020 | Ratnesh Kumar ... | G06N 3/0472 |
| 2020/0226421 A1* | 7/2020 | Almazan ................ | G06V 20/52 |

OTHER PUBLICATIONS

Shang, "Channel-Recurrent Variational Autoencoders" arXiv Jun. 12, 2017 (Year: 2017).*
Shang, "Channel-Recurrent Autoencoding for Imaging Modeling" arXiv Mar. 11, 2018. (Year: 2018).*
Kingma, Diederik P., et al., "Auto-Encoding Variational Bayes," ARXIV Preprint ARXIV:1312.6114 (2013), pp. 1-14.
Shang Wenling, et al., "Attentive Conditional Channel-Recurrent Autoencoding for Attribute-Conditioned Face Synthesis", IEEE Winter Conference on Applications of Computer Vision, 2019, pp. 1533-1542.

* cited by examiner

*Primary Examiner* — Juan A Torres
(74) *Attorney, Agent, or Firm* — Norton Rose Fulbright US LLP; Gerard Messina

(57) ABSTRACT

A method for generating a synthetic image with predefined properties. The method includes the steps of providing first values which characterize the predefined properties of the image that is to be generated and attention weights which characterize a weighting of one of the first values and feeding sequentially the first values and assigned attention weights as input value pairs into an generative automated learning system that includes at least a recurrent connection. An image generation system and a computer program that are configured to carry out the method are also described.

11 Claims, 5 Drawing Sheets

METHOD, APPARATUS AND COMPUTER PROGRAM FOR GENERATING AN IMAGE

CROSS REFERENCE

The present application claims the benefit under 35 U.S.C. § 119 of European Patent Application No. EP 19156898.9-1210 filed on Feb. 13, 2019, which is expressly incorporated herein by reference in its entirety.

FIELD

The present invention pertains to a method for generating realistic synthetic images by an automated learning system. The present invention further pertains to an image generation system as well as a computer program, which are configured to carry out the method.

BACKGROUND INFORMATION

Kingma, Diederik P. and Max Welling, "Auto-encoding variational Bayes." arXiv preprint arXiv:1312.6114 (2013) describes an autoencoder, which is based on a probabilistic model.

SUMMARY

According to a first aspect of the present invention, an example method for generating an image is provided. Preferably, this example method is a computer-implemented method. The method comprises the steps of providing first values (also called latent variables), which characterize a predefined composition of the image that is to be generated and attention weights, which characterize a weighting of the first values, e.g. a degree for which said first value characterize said image. Subsequently, each one of the attention weights is assigned to the respective first value and the first values and the assigned attention weights are fed as input value pairs into an automated learning system that comprises at least a recurrent connection. Thereupon, said input values are propagated sequentially through the automated learning system.

Owing to the attention weights and the recurrent connection, dependencies between the first values can be modeled and also learned during a training of the automated learning system. The attention weights assess (reducing or increasing) an influence of the respective first value during the generation of the image resulting in a better disentangle of the factors of variation between the first values (latent variables). Further, owing to the recurrent connecting, the expressiveness of the latent space is improved. Therefore, the advantage of the first aspect of the invention is that more accurate and realistic images can be generated.

It is noted that the meaning of image can be understood in a broad way, an image can be a multidimensional radar image or a medical image or a camera image and so forth.

The automated learning system is in particular a generative automated learning system that is configured or trained to generate the image depending on both the first values and the attention weights. Preferably, the first values characterize properties of the (visual) composition of the image that is to be generated, e.g., characterize an object within said image.

It is provided that the first values are each randomly sampled from a corresponding probability distribution. The respective probability distribution is characterized by at least two predetermined parameters. The first values and the attention weights are both divided into a plurality of blocks, which are sequentially fed as input value pairs into the automated learning system. The recurrent connection of the automated learning system is implemented by at least a LSTM (Long Short Term Memory)-module. The plurality of blocks are propagated sequentially through the LSTM and the output values of the LSTM are propagated together through a deep neural network of the automated learning system.

The probability distribution is preferably a Gaussian distribution. It has been recognized that the methods for image generation described in the related art literature do not model dependencies between the individual probability distributions. It is not feasible to determine and store the dependencies between the first values (latent variables) since the effort for that increases quadratically with the number of first values. The attention weights characterize in a certain manner the covariance between the first values. This covariance is then considered inside of the automated learning system by the recurrent connection that connects the inputs that are temporally propagated one after another through the automated learning system, in particular through the LSTM-module. Thereby, the naturally occurring correlation between properties of the image are considered by the image generation leading to more realistic generated images.

Further, it is provided that said two predefined parameters are calculated by a second automated learning system depending on an input image.

The second automated learning system is configured or trained to encode the input image. The advantage of this embodiment is the improvement of the image quality of autoencoders.

Further, it is provided that the generated image by the automated learning system is added to a set of training images and a third automated learning system is trained depending on said set of training images.

This example embodiment has the advantage that additional training data are generated for example to balance the training data, if some images of a certain class are underrepresented. A balanced training data set is necessary to prevent a learned bias by the third automated learning system. Furthermore, it is possible to generate training images, which are difficult to acquire since the events at which these images can be obtained, occur very rarely. Advantageously, the training images can be manipulated for an improved generalization (e.g., change a property of an object such as a color of cars.

Further, it is provided that the third automated learning system is trained for outputting at least a partial classification of its input image and a controlling value for a physical actor is calculated depending on the outputted classification of the third automated learning system.

The term classification can be broadly understood. Classification can be that the automatic learning system assigns at least a class to each input value of the automatic learning system, wherein the class characterizes a property and/or a feature and/or an object of the input image of the third automated learning system. Segmentation can be seen as a special kind of classification, wherein for segmentation at least some of the elements of the input value are assigned to at least one class, also a semantic region can be assigned to at least one of the several classes.

The output value of the third automatic learning system can be used to determine a control signal or control command. The control signal or the control command can be used to control the physical actuator. The physical actuator may be controlled corresponding to the control signal or the control command. In another embodiment, the physical actuator is controlled by a control unit. The control unit can be configured to determine the control signal or the control command dependent on the output of the automatic learning system. It is also possible that the control unit directly or indirectly controls the physical actuator dependent on the output value of the automatic learning system. The physical actuator can be a part of the technical system. The technical system can be for example an at least partly autonomous machine, robot, vehicle, mechanical tool, factory, or flying object, such as a drone. The physical actor may be a part of an engine or a brake.

The input images of the third automatic learning system can be received from sensor or can be received externally via the Internet or another data transmitting system or communication system.

In a second aspect of the present invention, an image generation system is proposed, which is configured to generate an image according to the method of the first aspect of the invention.

In a further aspect of the present invention, a computer program is provided, which is configured to carry out the first aspect of the present invention. The computer program comprises commands which—when executed on a computer—cause said computer to carry out the methods with all of its steps of the first aspect. Furthermore, a computer readable storage is proposed on which the computer program is stored. Furthermore, an apparatus is proposed which is configured to carry out the methods of the present invention.

Example embodiments of the above-mentioned aspects of the present invention are described below with reference to the figures.

DETAILED DESCRIPTION OF EXAMPLE EMBODIMENTS

Figure 1:
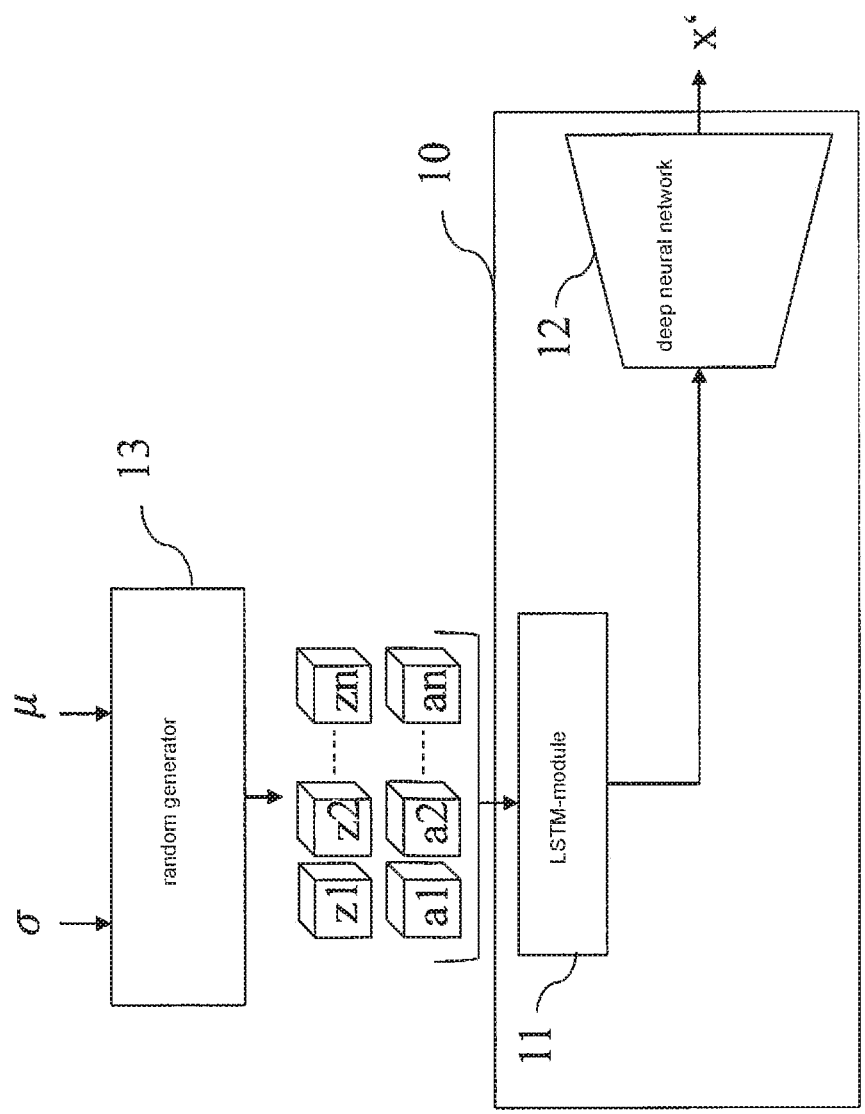
FIG. 1 shows a schematic depiction of a synthetic image generation system.

FIG. 1 shows an embodiment of a synthetic image generation system (10) that comprises a LSTM-module (11) that is connected to a deep neural network (12). The LSTM-module (11) receives as input values a plurality of pairs of at least a first value (z) and at least an attention weight (a). The first values (z) characterize properties of the image (x') that is to be generated, e.g., at least objects and/or colors. Said pairs of input values are sequentially propagated through the LSTM-module (11). The outputted values of the LSTM-module (11) are grouped together as an input value for the deep neural network (12) and propagated through the deep neural network (12). The deep neural network (12) outputs then a synthetic image (x').

The first values (z) are sampled from the predefined, preferably multidimensional, probability distribution that is characterized by at least the two parameters ($\sigma$, $\mu$). Alternatively, the first values (z) are sampled from several different predefined probability distributions. The two parameters ($\sigma$, $\mu$) are calculated according to FIG. 2 or FIG. 3.

Preferably, one of the two parameters ($\mu$) characterizes expectation values of the predefined probability distribution and the other parameter ($\sigma$) characterizes variances of the predefined probability distribution. The two parameters ($\sigma$, $\mu$) can be utilized to initialize a random generator (13). This random generator (13) samples randomly the first values (z), wherein the dimensions of the first values (z) and the dimensions of the attention weights (a) are equal. Both dimensions of the first values (z) and the attentions weights (a) are dependent on the dimensions of the two parameters ($\sigma$, $\mu$). For example, the two parameters ($\sigma$, $\mu$) have the dimensions of w×h×c. Then, the first values (z) and the attention weights (a) both have the same dimensions of w×h×c.

In a preferred embodiment, the pairs of input values of the LSTM-module (11) are blocks of size T of the first values (z) and the attention weights (a), consequently the input values of the LSTM-module (11) have respectively the dimensions of w×h×c/T. The blocks can be referred to as channels.

Figure 2:
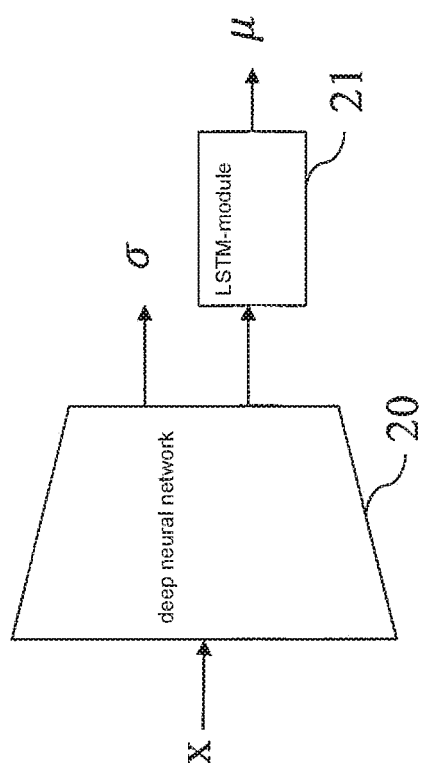
FIG. 2 shows schematically an encoder.

FIG. 2 shows exemplarily an encoder which calculates dependent on an input image (x) the two parameters ($\sigma$, $\mu$), each with preferably the dimension of w×h×c. The encoder of FIG. 2 can be seen as an encoder that is part of an autoencoder. For the depicted embodiment of FIG. 2, the encoder together with the automated learning system (10) of FIG. 1 is implemented as Variational Autoencoder. The encoder also comprises a deep neural network (20) that outputs the two parameters ($\sigma$, $\mu$) depending on a parametrization of the deep neural network (20) and depending on the input image (x) of the encoder. Optionally, the parameter ($\sigma$), that characterizes the variance of the predefined distribution, can be further processed by a LSTM-module (21) of the encoder. Similar to the LSTM-module (11) of the automated learning system (10), the input values of the further LSTM-module (21) can be grouped into blocks of a given size and propagated sequentially through the LSTM-module (21) of the encoder.

Figure 3:
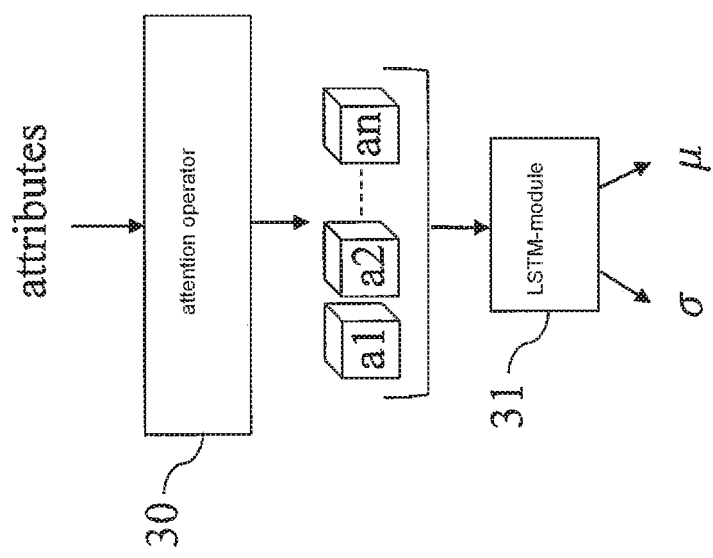
FIG. 3 shows schematically a system for calculating at least attention weights depending on predefined attributes.

FIG. 3 shows an embodiment of a system for calculating the two parameters ($\sigma$, $\mu$) depending on given attributes. The given attributes characterize the image that is to be generated by the automated learning system (10). Preferably, the given attributes have a binary encoding of properties that characterizes the image (x') that is to be generated by the automated learning system (10). The attributes are proceeded by an attention operator (30) that outputs the attention weights (a).

Preferably, the attention weights (a) have the same size as the attributes and the sum of the attention weights (a) is approximately equal to the sum of the attributes. The attention operator can be a fully connected neural network.

The calculated attention weights (a) of the attention operator (30) are subsequently propagated through a prior LSTM-module (31) that outputs the two parameters ($\sigma$, $\mu$) depending on the inputted attention weights (a).

Figure 4:
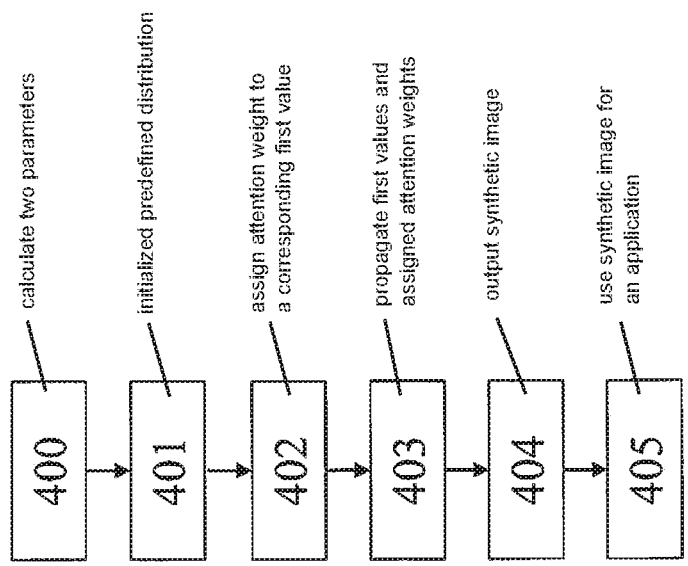
FIG. 4 shows schematically a flow chart of a method for generating an image.

FIG. 4 shows exemplarily a flowchart of a method for generating synthetic image (x').

The method begins with step 400. In this step, the two parameters ($\sigma$, $\mu$) are calculated either according to FIG. 2 or according to FIG. 3.

In the subsequent step 401, the predefined distribution is initialized by the two parameters ($\sigma$, $\mu$) calculated in step 400.

Then, the first values (z) are sampled from the initialized distribution. Preferably, the first values (z) have the same dimensions as the two parameters ($\sigma$, $\mu$). As shown in FIG. 1, the sampling of the first values (z) can be done by the random generator (13).

After step 401 is terminated, step 402 is carried out. Each attention weight is assigned to a corresponding first value. Optionally, the first values (z) and assigned attention weights (a) are divided into a plurality of blocks with a given size T.

In the subsequent step 403, the first values (z) and the assigned attention weights (a) are propagated sequentially through the automated learning system (10). If the first values (z) and attention weights (a) are divided into blocks, these blocks will be propagated sequentially through the automated learning system (10) depicted in FIG. 1.

After the propagation of the input values has been completed, the automated learning system (10) outputs the synthetic image (x') in step 404.

In the optional step 405, the synthetic image (x') is used for a given application. The application is exemplarily training of a third automated learning system. For said training, the synthetic image (x') is added to a training data set, wherein the third automated learning system is trained depending on said training data set.

Before performing step 400, the automated learning system (10) including the encoder of FIG. 2 can be trained as a Variational Autoencoder according to following training equation:

$$\mathcal{L}_{acVAE} = -KL(q_\phi(z|x) \| p_\theta(z|a)) + E_{q(Z|X,a)}[\log p_\theta(x|a,z)] \quad (1)$$

wherein KL(•) is the Kullback-Leibler divergenz, which measures a similarity between the distributions q and p and E(•) is the expected reconstruction likelihood.

After the training according to eq. (1), the automated learning system (10) and the encoder of FIG. 2 can be operated independently from each other.

Figure 5:
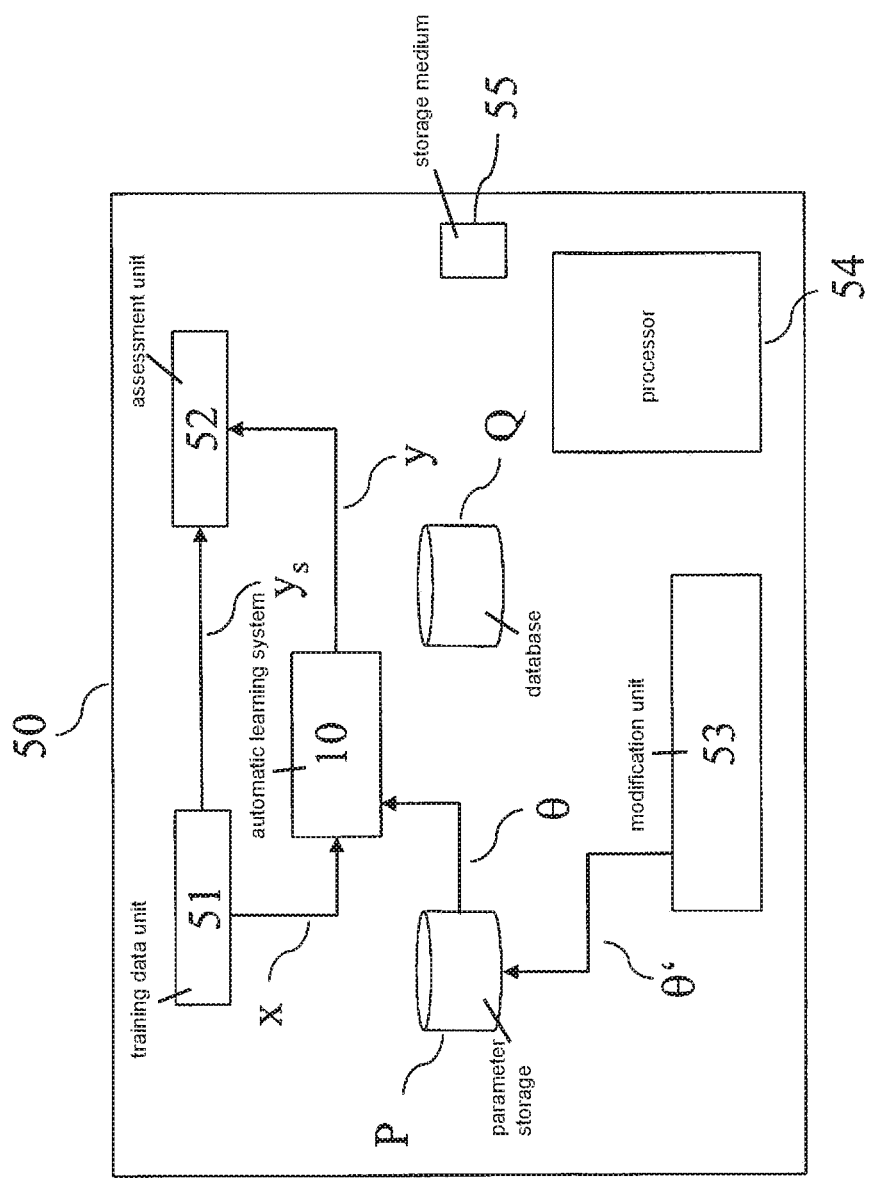
FIG. 5 shows an embodiment of a training system configured to train the image generation system.

Shown in FIG. 5 is an embodiment of a training system 50 for (re-)training the automatic learning system 10, particularly the training system is configured to train the automated learning system (10) according to eq. (1). A training data unit 51 determines input signals x, which are passed on to automatic learning system 10. For example, training data unit 51 may access a computer-implemented database Q in which a set of training data is stored. This set comprises pairs of input signal x and corresponding desired labeled output signal $y_s$.

Training data unit 51 selects samples from this set, e.g. randomly. Input signal x of a selected sample is passed on to automatic learning system (10). Desired output signal $y_s$ passed on to assessment unit 52.

Automatic learning system 10 computes its output signals y depending on the provided input signals x. These output signals x are also passed on to assessment unit 52.

A modification unit 53 determines updated parameters $\Theta'$ depending on input from assessment unit 52. Updated parameters $\Theta'$ are transmitted to parameter storage P to replace present parameters of $\Theta$ the automatic learning system or adjust the parameters according to the updated parameters $\Theta'$. Please note that also parameter $\phi$ can be updated by the modification unit 53 depending ton the input from the assessment unit 52.

For example, it may be envisioned that assessment unit 52 determines the value of the loss functions L depending on output signals y and desired output $y^{true}$. Modification unit 53 may then compute updated parameters $\Theta'$ using e.g. stochastic gradient descent to optimize the loss function $\mathcal{L}$ as shown in eq. (1).

The training system 50 can be also used to train either solely the automated learning system (10) or the automated learning system (10) including the encoder of a training according to equation (1).

In another embodiment, the generated images of the automated learning system according to step 404 of FIG. 4 can be added to the database Q. The training system is used in the embodiment to train the third automated learning system, this is not depicted in FIG. 5. For this embodiment, the automated learning system (10) in FIG. 5 has to be replaced by the third automated learning system. In addition, the assessment unit 52 and the modification unit 53 have to be modified such that a suited loss function is utilized to determine the updated parameters of the third automated learning system.

Furthermore, training system 50 may comprise a processor 54 (or a plurality of processors) and at least one machine-readable storage medium 55 on which instructions are stored for training.

What is claimed is:

1. A method for generating an image with a predefined composition, comprising the following steps:
    providing first values, which characterize the predefined composition of the image, and attention weights, which characterize a weighting of the first values, wherein the attention weights are calculated depending on the first values or depending on an input image;
    assigning each one of the first values a respective one of the attention weights;
    sequentially feeding the first values and the respective assigned attention weights as pairs of input values into an automated learning system that includes at least a recurrent connection; and
    sequentially propagating the pairs of input values through the automated learning system, wherein the automated learning system outputs the image.

2. The method according to claim 1, wherein:
    the first values are randomly sampled from a corresponding probability distribution;
    each probability distributions is characterized by at least two predetermined parameters;
    a plurality of pairs of the input values are combined to give one block, and a plurality of the blocks are sequentially fed as the input values into the automated learning system;
    the recurrent connection of the automated learning system includes at least one LSTM (Long Short Term Memory)-module; and
    the plurality of blocks are propagated sequentially through the LSTM-module and output values of the LSTM-module are propagated through a deep neural network of the automated learning system.

3. The method according to claim 2, wherein the two predefined parameters are calculated by a second automated learning system depending on the input image.

4. The method according to claim 2, wherein the attention weights are calculated depending on predefined attributes, which characterize the composition of the image, and wherein the two predetermined parameters are calculated depending on the attention weights by sequentially propagating the attention weights through a further LSTM-module.

5. The method according to claim 1, wherein the generated image by the automated learning system is added to a set of training images, and wherein a third automated learning system is trained depending on the set of training images.

6. The method according to claim 5, wherein the third automated learning system is trained for outputting at least a partial classification of its input image, and wherein a controlling value for a physical actor is calculated depending on the outputted classification of the third automated learning system.

7. An image generation system which is configured to generate an image with a predefined composition, the image generation system comprising:
an automated learning system that is configured to generate the image depending on received first values, and depending on received attention weights assigned to the first values, the first values characterizing the predefined composition of the image, and the attention weights characterizing a weighting of the first values, each of the attention values being assigned to a respective one of the first values, the first values and the respective assigned attention weights being received as pairs of input values by the automated learning system, and wherein the attention weights are calculated depending on the first values or depending on an input image.

8. The image generation system according to claim 7, wherein the automated learning system includes at least a recurrent connection, and wherein the automated learning system processes sequentially the first values and the attention weights.

9. The image generation system according to claim 8, wherein:
the recurrent connection is implemented by at least one LSTM (Long Short Term Memory)-module,
the automated learning system further includes a deep neural network, an output of the LSTM-module being connected to an input of the deep neural network,
the image generation system further comprises a random generator that is configured to randomly sample the first values from a distribution which is characterized by at least two predetermined parameters.

10. The image generation system according to claim 7, wherein a further system is configured to calculate the attention weights depending on predefined attributes, which characterize the image, and wherein a further LSTM-module is configured to calculate, depending on the attention weights, the two predetermined parameters.

11. A non-transitory computer-readable data carrier on which is stored a computer program for generating an image with a predefined composition, the computer program, when executed by a computer, causing the computer to perform the following steps:
providing first values, which characterize the predefined composition of the image, and attention weights, which characterize a weighting of the first values, wherein the attention weights are calculated depending on the first values or depending on an input image;
assigning each one of the first values a respective one of the attention weights;
sequentially feeding the first values and the respective assigned attention weights as pairs of input values into an automated learning system that includes at least a recurrent connection; and
sequentially propagating the pairs of input values through the automated learning system, wherein the automated learning system outputs the image.

* * * * *